United States Patent
Heuer et al.

(10) Patent No.: US 9,184,830 B2
(45) Date of Patent: Nov. 10, 2015

(54) DEVICE AND UNIT FOR PROVIDING AN ASSOCIATIVE LINK BETWEEN A VEHICLE AND A CHARGING STATION, VEHICLE HAVING THE DEVICE AND CHARGING STATION HAVING THE UNIT

(71) Applicant: SIEMENS AKTIENGESELLSCHAFT, Munich (DE)

(72) Inventors: Joerg Heuer, Oberhaching (DE); Anton Schmitt, Vaterstetten (DE)

(73) Assignee: Siemens Aktiengesellschaft, Munich (DE)

( * ) Notice: Subject to any disclaimer, the term of this patent is extended or adjusted under 35 U.S.C. 154(b) by 294 days.

(21) Appl. No.: 13/930,342

(22) Filed: Jun. 28, 2013

(65) Prior Publication Data
US 2014/0004792 A1 Jan. 2, 2014

(30) Foreign Application Priority Data
Jun. 28, 2012 (DE) .......................... 10 2012 012 860

(51) Int. Cl.
| H04M 1/00 | (2006.01) |
| H04B 1/38 | (2015.01) |
| H04B 7/24 | (2006.01) |
| B60L 11/18 | (2006.01) |
| H04B 5/00 | (2006.01) |
| H04W 84/12 | (2009.01) |

(52) U.S. Cl.
CPC ................ *H04B 7/24* (2013.01); *B60L 11/182* (2013.01); *B60L 11/1833* (2013.01); *H04W 84/12* (2013.01); *Y02T 10/7005* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ..... B06L 11/182; B06L 11/1829; H04B 7/26; H04W 84/12; Y02T 90/125
USPC ............ 455/41.1, 41.2, 572, 573, 574, 575.9, 455/96, 99, 345
See application file for complete search history.

(56) References Cited

U.S. PATENT DOCUMENTS

| 8,878,393 B2 | 11/2014 | Kirby et al. |
| 8,963,486 B2 | 2/2015 | Kirby et al. |
| 8,975,864 B2 | 3/2015 | Kim |
| 2010/0201201 A1 | 8/2010 | Mobarhan et al. |
| 2011/0115605 A1* | 5/2011 | Dimig et al. ................. 340/5.61 |
| 2011/0285349 A1 | 11/2011 | Widmer et al. |
| 2012/0098483 A1* | 4/2012 | Patel .............................. 320/108 |
| 2012/0280574 A1* | 11/2012 | Hur et al. ...................... 307/104 |
| 2013/0026848 A1 | 1/2013 | Ito |

FOREIGN PATENT DOCUMENTS

| CN | 102318160 A | 1/2012 |
| CN | 102318211 A | 1/2012 |

(Continued)

*Primary Examiner* — Eugene Yun
(74) *Attorney, Agent, or Firm* — Laurence A. Greenberg; Werner H. Stemer; Ralph E. Locher

(57) ABSTRACT

A device and a unit provide an associative link between a vehicle and a charging station, in which the charging station supplies a battery of the vehicle with energy. A vehicle having the device and a charging station having the unit are also provided.

30 Claims, 2 Drawing Sheets

(56) References Cited

FOREIGN PATENT DOCUMENTS

| | | |
|---|---|---|
| CN | 102318213 A | 1/2012 |
| JP | 2012005308 A | 1/2012 |
| WO | 2011049352 A1 | 4/2011 |
| WO | 2011093291 A1 | 8/2011 |

\* cited by examiner

DEVICE AND UNIT FOR PROVIDING AN ASSOCIATIVE LINK BETWEEN A VEHICLE AND A CHARGING STATION, VEHICLE HAVING THE DEVICE AND CHARGING STATION HAVING THE UNIT

CROSS-REFERENCE TO RELATED APPLICATION

This application claims the priority, under 35 U.S.C. §119, of German Patent Application DE 10 2012 012 860.6, filed Jun. 28, 2012; the prior application is herewith incorporated by reference in its entirety.

BACKGROUND OF THE INVENTION

Field of the Invention

The present invention relates to a device and a unit for providing an associative link between a vehicle and a charging station. The invention also relates to a vehicle having the device and a charging station having the unit.

The charging of vehicles, such as electric vehicles for example, requires communication between the vehicle and the charging infrastructure, that is to say the charging station. Since shared media are frequently used for communication, that is to say several message transmissions from the same transmission medium can occur in parallel, an unambiguous allocation between the vehicle and the charging station, that is to say an associative link, must occur between the vehicle and the charging station.

That is necessary to ensure that information is exchanged only with the vehicle regarding the supply of energy for charging its battery, which ultimately is also intended to receive the electrical energy.

Where charging takes place through a cable between the vehicle and the charging station, power line communication can be employed through the signal line and the ground wire in the charging cable. In that case, the association is realized by using the charging cable and the communication takes place through the charging cable.

In the case of inductive charging, that is to say charging without a charging cable, the problem arises in which an association between the vehicle and the charging station is consequently made more difficult since no conductive link exists between the vehicle and the charging station.

BRIEF SUMMARY OF THE INVENTION

It is accordingly an object of the invention to provide a device and a unit for providing an associative link between a vehicle and a charging station, a vehicle having the device and a charging station having the unit, which overcome the hereinafore-mentioned disadvantages of the heretofore-known devices, units, vehicles and stations of this general type and which facilitate an association between a vehicle and a charging station at which a battery of the vehicle is charged in a simple and economical fashion by the use of wireless communication.

With the foregoing and other objects in view there is provided, in accordance with the invention, a device for providing an associative link between a vehicle and a charging station, with the charging station supplying a battery of the vehicle with energy, the device comprising:

a first antenna for data exchange with a data antenna of a communications unit, the first antenna being fixed to the vehicle;

a second antenna for data exchange with a third antenna of the charging station for providing the associative link between the vehicle and the charging station, the second antenna being embodied in such a way that a signal radiated from the second antenna to the third antenna is able to be received substantially only by the third antenna, with the second antenna being fixed to the vehicle; and a radio controller, the first antenna and the second antenna being connected to the radio controller and the radio controller operating in accordance with a specified standard, in particular WLAN—Wireless Local Area Network, the radio controller being integrated in the vehicle.

It is possible to implement the device in an economical manner by the use of the first antenna and the second antenna, which are connected to the radio controller. In addition, the first, second and third antennas, as well as the data antenna, operate according to a standard, so that the device can be realized inexpensively with easily available components. The associative link is understood to be a coupling between the second antenna and the third antenna, with the configuration of the second antenna with respect to the third antenna ensuring that only these two antennas can establish a common connection. This ensures that only the vehicle which is connected to the charging station through the associative link has access to the charging station.

In accordance with another feature of the invention, a radiation characteristic of the radiated signal of the second antenna is configured so that the radiation characteristic has a lobe in the direction of the third antenna. This allows the associative link to be provided more reliably since the coupling of the second antenna with the third antenna is improved and a coupling of an antenna of another vehicle is made more difficult.

In accordance with a further feature of the invention, a transmitter power of the radiated signal of the second antenna is configured so that the transmitter power is reduced in such a way that the radiated signal is able to be received substantially only within a gap between the second antenna and the third antenna. In this case again the associative link is more reliable since the radiated signal outside the second and third antenna is very weakly received or not at all. The radiated signal extends for 25 cm, 50 cm or a maximum of 100 cm, for example.

In accordance with an added feature of the invention, the transmitter power is reduced for an initial or first period, in particular during the provision of the associative link, and is increased for a second period compared to the transmitter power of the initial period, in particular after the provision of the associative link. This ensures reliable provision of the associative link, that is to say a reliable coupling between the vehicle and the charging station and the associative link can be further used for data transmission at a later time. Data throughput can be increased by increasing the transmitter power in the second period, during which, for example, the data circuit between the second and third antennas is protected against attacks by a key which was exchanged during the first period.

In accordance with an additional feature of the invention, the second antenna is oriented so that a signal radiated from the third antenna can be received at maximum strength in a specified area around a direct line of sight between the second antenna and the third antenna. This prevents spurious radiation from other antennas in the vicinity of the second antenna, since the receiving field of the second antenna can be focused on the radiated signal of the third antenna.

In accordance with yet another feature of the invention, the second antenna is activated only when the vehicle reaches a specified area, in particular a charging position of the charging station, so that it is made difficult for an attacker to compromise the associative link.

In accordance with yet a further feature of the invention, the second antenna is activated only when the speed of vehicle is below a specified speed, then vehicle resources, such as electrical energy, can be saved since the operation of the second antenna is only activated when the charging position is reached.

In accordance with yet an added feature of the invention, the second antenna is preferably mounted at a side of the vehicle facing a road, whereby the signal radiated by the third antenna is blocked by the vehicle and is therefore only accessible with difficulty or not accessible to other antennas in the vicinity of the second antenna. Consequently, the associative link is more reliable.

In accordance with yet an additional feature of the invention, at least two second charging position antennas are each mounted at two different sides of the vehicle, one of the at least two second charging position antennas being used to provide the associative link, and is the one of the at least two second charging position antennas which receives the strongest radiated signal from the third antenna. As a result, on one hand, different versions of charging stations can be used by the vehicle. On the other hand, a reliable associative link can be ensured when spurious radiation occurs on one side of the vehicle.

In accordance with again another feature of the invention, the associative link preferably exists between the vehicle and the charging station if a signal radiated by the second antenna is able to be received by the third antenna at least at a specified first signal strength. This ensures that the second and third antennas are mutually oriented and in close proximity, so as to guarantee a reliable associative link.

In accordance with again a further feature of the invention, an established vehicle charging position is known if the radiated signal of the second antenna can be received by the third antenna at a specified second signal strength. As a result, the second antenna is used both for provision of the associative link and for the determination of the charging position on the charging station. The accuracy of the determination of the precise charging position is facilitated by the application for establishing the charging station.

With the objects of the invention in view, there is also provided a unit for providing an associative link between a vehicle and a charging station, with the charging station supplying energy to a battery of the vehicle, the charging station comprising:

a data antenna for data exchange with a first antenna, with the first antenna being mounted on the vehicle and the data antenna being mounted on the charging station;

a third antenna of the charging station for data exchange with a second antenna for providing the associative link between the vehicle and the charging station, the third antenna being embodied in such a way that a signal radiated from the third antenna to the second antenna is substantially able to be received only by the second antenna, and the third antenna being mounted on the charging station; and a second radio controller, with the third antenna and the data antenna being connected to the second radio controller and the second radio controller operating according to a specified standard, in particular a WLAN—Wireless Local Area Network, the second radio controller being integrated in the charging station.

The unit can be economically realized by using the data antenna and the third antenna, which are connected to the second radio controller. In addition, the first, second and third antennas, as well as the data antenna, operate according to a standard, so that the device can be realized inexpensively with easily available components.

The associative link is understood to be a coupling between the second antenna and the third antenna, with the configuration of the second antenna with respect to the third antenna ensuring that only these two antennas can establish a common connection. This ensures that only that vehicle which is connected to the charging station through the associative link has access to the charging station.

In accordance with another feature of the invention, preferably a radiation characteristic of the radiated signal of the third antenna is configured so that the radiation characteristic has a lobe in the direction of the second antenna. This allows the associative link to be provided more reliably since the coupling of the second antenna with the third antenna is improved and a coupling of an antenna of another vehicle is made more difficult.

In accordance with another feature of the invention, a transmitter power of the radiated signal of the third antenna is configured so that the transmitter power is reduced in such a way that the radiated signal is able to be received substantially only within a gap between the second antenna and the third antenna. In this case again the associative link is more reliable since the radiated signal outside the second and third antennas is very weakly received or not received at all. The radiated signal extends for 25 cm, 50 cm or a maximum of 100 cm, for example.

In accordance with a further feature of the invention, the transmitter power is reduced for an initial or first period, in particular during the provision of the associative link, and is increased for a second period compared to the transmitter power of the initial period, in particular after the provision of the associative link. This ensures reliable provision of the associative link, that is to say a reliable coupling between the vehicle and the charging station and the associative link can be further used for data transmission at a later time. Data throughput can be increased by increasing the transmitter power at the second period, during which, for example, the data circuit between the second and third antennas is protected against attacks by a key which was exchanged during the first period.

In accordance with an added feature of the invention, the third antenna is preferably oriented so that a signal radiated from the second antenna can be received at maximum strength in a specified area around a direct line of sight between the second antenna and the third antenna. This prevents spurious radiation from other antennas in the vicinity of the third antenna, since the receiving field of the second antenna can be focused on the radiated signal of the third antenna.

In accordance with an additional feature of the invention, the third antenna is activated only when the vehicle reaches a specified area, in particular a charging position of the charging station. This makes it difficult for an attacker to compromise the associative link.

In accordance with yet another feature of the invention, the third antenna is preferably activated only when the speed of the vehicle is below a specified speed, so that vehicle resources, such as electrical energy, can be saved since the operation of the second antenna is activated only when the charging position is reached.

In accordance with yet an added feature of the invention, the third antenna is mounted on or in the base of the charging station. This can achieve good coupling with the second antenna, which is mounted on the underside of the vehicle.

Furthermore, mounting on or in the base ensures a rugged implementation, since the vehicle can also drive over the third antenna.

In accordance with yet an additional preferred feature of the invention, at least two third charging position antennas are each mounted at different positions of the charging station, and one of the at least two third charging position antennas can be used for provision of the associative link, and is the one of the at least two third charging position antennas which receives the strongest radiated signal from the second antenna. On one hand, this allows a vehicle with different positioning of the second antenna to be serviced by the charging station. On the other hand, where spurious radiation occurs at a position of a first of the third antennas of the charging station, a reliable associative link can be guaranteed at a position at which a further third antenna is located.

In accordance with again another feature of the invention, the associative link preferably exists between the vehicle and the charging station if a signal radiated by the third antenna is able to be received by the second antenna at least at a specified first signal strength. In this case, this ensures that the second and third antennas are mutually oriented and disposed in close proximity so as to guarantee a reliable associative link.

In accordance with again a further feature of the invention, an established vehicle charging position is known if the radiated signal of the third antenna can be received by the second antenna at a specified second signal strength. As a result, the third antenna is used both for provision of the associative link and for the determination of the charging position on the charging station. The accuracy of the determination of the precise charging position is facilitated by the application for establishing the charging station.

With the objects of the invention in view, there is furthermore provided a vehicle, which can be constructed as an electric vehicle, comprising the device.

With the objects of the invention in view, there is concomitantly provided a charging station comprising the unit.

Other features which are considered as characteristic for the invention are set forth in the appended claims.

Although the invention is illustrated and described herein as embodied in a device and a unit for providing an associative link between a vehicle and a charging station, a vehicle having the device and a charging station having the unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
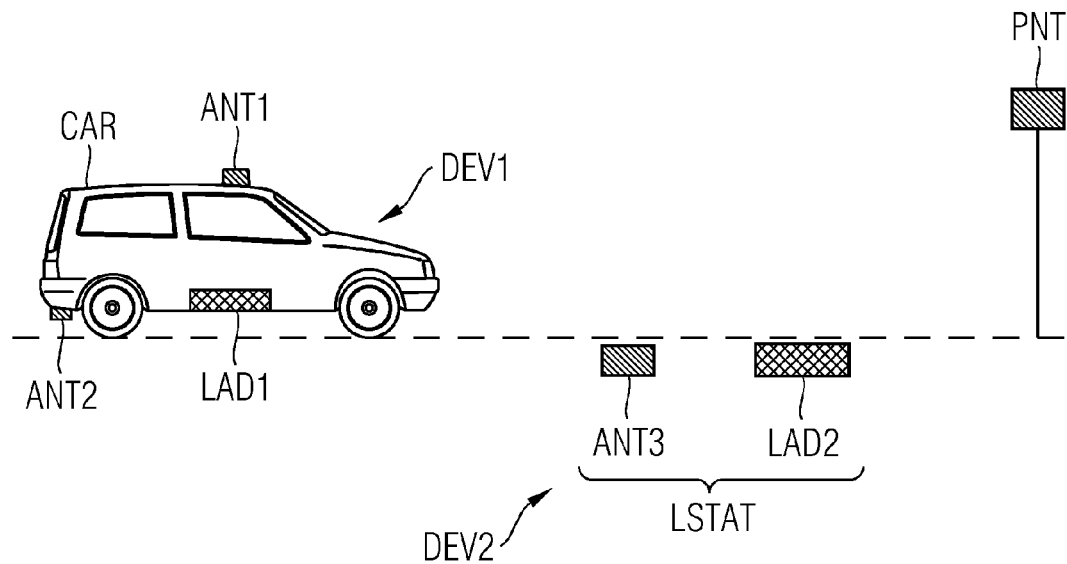
FIG. 1 is a diagrammatic, side-elevational view of a vehicle approaching a charging station.
Figure 2:
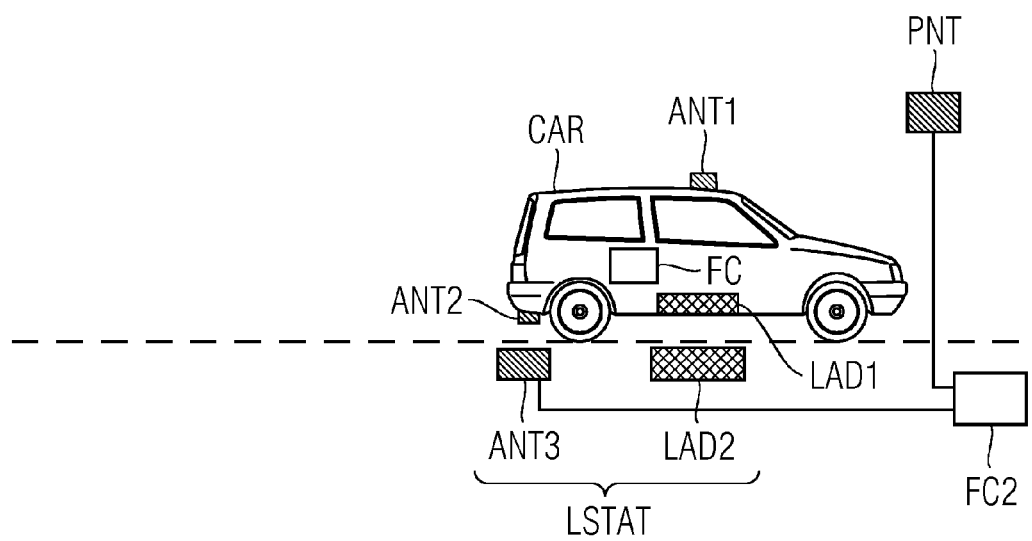
FIG. 2 is a side-elevational view of a vehicle positioned on the charging station.

Referring now in detail to the figures of the drawings, in which elements having the same function and mode of operation are denoted by identical reference symbols, and first, particularly, to FIG. 1 thereof, there is seen a vehicle CAR on the left-hand side of the figure, which is to be charged at a charging station LSTAT. FIG. 1 also shows a device DEV1 for providing an associative link between the vehicle CAR and the charging station LSTAT. As can be seen in FIG. 2, the vehicle drives to a specified charging position of the charging station. FIG. 2 also shows a unit DEV2 for providing the associative link between the vehicle CAR and the charging station LSTAT. The charging position is defined so that a charging coil LAD1 has to come to rest at a specific geometrical position with respect to a transmitting coil LAD2 of the charging station.

Upon reaching the charging position, an unambiguous association between the vehicle and the charging station is realized in order to prevent a different vehicle from being charged up on the basis of vehicle association data.

The vehicle has two antennas, including a first antenna ANT1 for data exchange with a data antenna PNT of a communications unit. In the present example the charging station also includes the communications unit with the data antenna, with which the vehicle can retrieve multimedia data from the Internet, for example. A second antenna ANT2 of the vehicle is mounted on the underbody of the vehicle which lies directly above a third antenna ANT3 of the charging station, when the charging position is reached. The third antenna is mounted on or in a base covering of the charging station.

Figure 3:
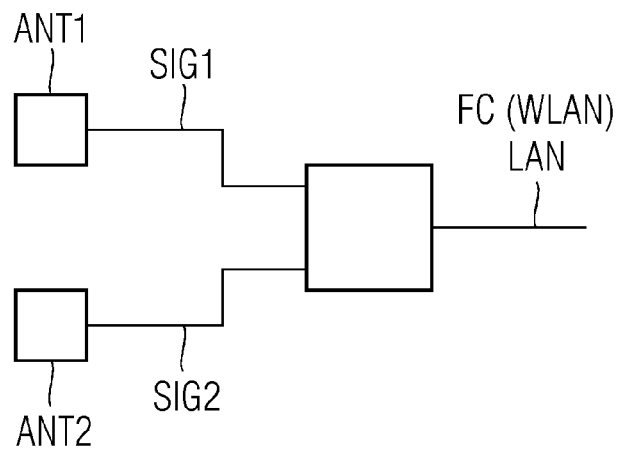
FIG. 3 is a block diagram of a link from a first antenna and a second antenna to a radio controller.

As FIG. 3 shows, the first antenna and the second antenna are connected to a radio controller FC by signal lines SIG1, SIG2. The radio controller contains an HF (high-frequency) modulation unit, for example, with which the modulated radio signals can be passed through the signal lines to the antennas for transmission. Alternatively, each of the antennas can also have a dedicated HF modulation unit. Furthermore, the radio controller includes a data processing unit, for example a communications controller, with which vehicle data, for example, can be received and transmitted through a LAN data line and conditioned and transmitted or received according to a specified wireless transmission standard, for example WLAN (WLAN: Wireless Local Area Network) in accordance with IEEE 802.11 (IEEE: Institute of Electrical and Electronics Engineers). The radio controller is part of the vehicle.

Therefore, when the charging position is reached, only the first antenna can be active and when the charging position is reached the second antenna is activated after the first antenna is switched off. Alternatively to this, both antennas can also be activated, for example operating on different frequencies such as 2.4 GHz and 5 GHz or in the same frequency band. Moreover, several second antennas can be installed at different locations of the vehicle, with only the second antenna having the highest signal power of a signal emitted by the third antenna being used to create the associative link. In this case, the second antennas which do not have the strongest signal are also switched off.

The second antenna can also be mounted on the front, rear, driver side or passenger side of the vehicle.

Figure 4:
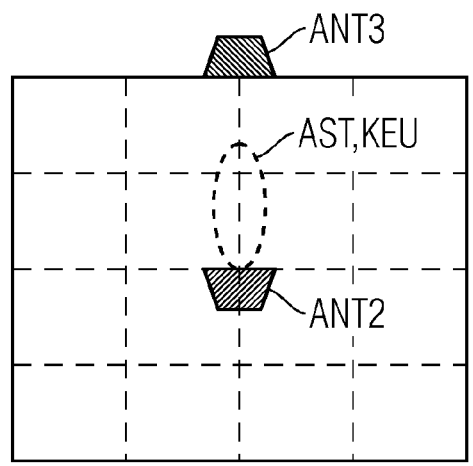
FIG. 4 is a diagram showing a directional characteristic of a transmitted signal.

After the charging position has been reached, the second antenna sends a radio signal to the third antenna in order to exchange association information through the associative link, formed of the wireless link between the second antenna and the third antenna. In order to reliably ensure that only the vehicle and the charging station communicate with each other through the associative link, respective radiation characteristics AST of the radiated signals of the second or third antenna in each case have a lobe KEU facing in the direction of the other antenna, that is to say from the second to the third or from the third to the second antenna. FIG. 4 shows an example of such a radiation characteristic radiated from the second antenna towards the third antenna, shown in two-dimensional space. It is clear that the radiation characteristic can also be configured as a lobe in three-dimensional space. This lobe can, inter alia, be realized by a special antenna configuration or by a structural configuration, for example an aperture, in such a way that radiation is a made possible only in an angular segment of the antenna.

Furthermore, the transmitter power of the radiated signal, for example that of the second antenna, is reduced so that the radiated signal is substantially receivable only within a gap between the second and third antennas. In practice this means that the transmitter power is reduced so that the radio signal is hardly receivable at a distance that is greater than the gap between the second and third antennas, in such a way that a meaningful reconstruction of the radio signal is no longer possible, for example an error rate exceeds a high value, of 25% for example.

In addition, the second or third antenna can also have a protective device which does not allow radiated signals to be transmitted further out through the respective antenna. The second antenna is therefore located on the underside of the vehicle and is directed towards the third antenna which is let into a base of the charging station. In this case, a grounded metal plate can be provided around the third antenna, which prevents reflection of signals radiated by the second antenna or retransmission of radiated signals outside of the effective range of the third antenna. Likewise, if the underbody of the vehicle is formed of metal components, for example, it counteracts retransmission of signals radiated from the third antenna. Increased reliability with regard to the associative link can therefore be achieved by this additional screening of the vehicle and of the charging station.

Figure 5:
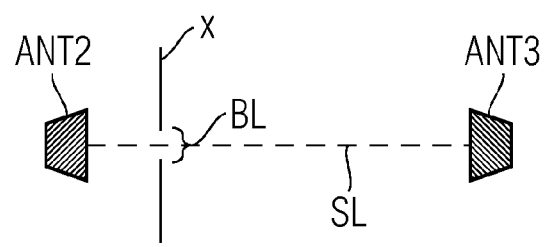
FIG. 5 is a diagram showing a reception area of the second antenna.

Moreover, a metal orifice plate X is installed in front of the second antenna so that a signal radiated from the third antenna can be received at maximum strength in a specified region BL, for example 1.5 cm, around a direct line of sight SL between the second antenna and the third antenna, as is seen in FIG. 5. In this case, direct line of vision is understood to be the shortest link between the second and third antennas, for example. In the example according to FIG. 5, the conducting region of the metal orifice plate is circular. Generally speaking, this can also take other forms. In addition, the specified region can also be defined by devices other than a metal orifice plate. Moreover, the region can also be variable, for example in relation to the speed of the vehicle, since with decreasing speed it can be assumed that the accuracy of the positioning of the vehicle on the charging station increases and therefore with a reduction of the region, disturbing effects of other radio systems are reduced and therefore the provision of the associative link can be more reliable.

Furthermore, the second antenna is only connected into the circuit when the speed of the vehicle is below a specified value, for example 5 km/h. The associative link between the vehicle and the charging station can be recognized by the fact that the radiated signal power of the second antenna is detected by the third antenna and the existence of the associative link is established when a specified first signal strength is exceeded.

In addition, the exact charging position can also be detected with the aid of the second and third antennas. If, as is shown in FIGS. 1 and 2, the vehicle slowly moves to the determined charging position, then at a certain distance between the second and third antennas, a signal radiated from the second antenna is only weakly detected by the third antenna. If the signal strength of the radiated or detected signal increases over time, then a charging position becomes increasingly closer until at least one specified second signal strength is detected by the third antenna. In addition to the provision of an associative link, the present invention can therefore also assist in exact positioning by locating the optimum charging position between the vehicle and the charging station.

Moreover, at a greater distance between the charging station and the vehicle, a data circuit can be employed by the first antenna and the data antenna for the positioning of the vehicle in the direction of the charging station. Instead of the data circuit, a circuit including the second and third antennas can be used for positioning only when a specified distance is reached between the charging station and the vehicle.

In the present example, the second antenna is integrated in the underside of the vehicle and the third antenna is on or in the base of the charging station. The invention is not limited to just these variants. The second antenna and the third antenna can also be installed at other positions on the vehicle and on the charging station, but with the proviso that a reliable associative link can be provided when the charging position is reached.

The devices for providing the associative link between the vehicle and the charging station can, at least partially, be implemented and processed in software and/or completely in hardware. Individual steps to be carried out by the devices can be stored in a memory in the form of a machine-readable code, for example, and read out and processed by a processor interfaced to the memory.

The invention and its developments have been explained with reference to examples. The invention is not restricted to these examples. Rather, individual variants can also be combined in a variety of ways. In particular, developments which involve the second antenna, such as limiting the directional characteristic, reducing the transmitter power or limiting a reception area alternatively or additionally to the second antenna and also in the case of the third antenna can be implemented.

The invention claimed is:

1. A device for providing an associative link between a vehicle having a battery and a charging station supplying the battery with energy, the device comprising:
   a data antenna of a communications unit;
   a first antenna fixed to the vehicle and configured for data exchange with said data antenna;
   a third antenna disposed at the charging station;
   a second antenna fixed to the vehicle and configured for data exchange with said third antenna to provide the associative link between the vehicle and the charging station;
   said second antenna configured to permit a signal radiated from said second antenna to said third antenna to be received substantially only by said third antenna; and
   a radio controller integrated in the vehicle, connected to said first and second antennas and configured to operate in accordance with a specified standard.

2. The device according to claim 1, wherein the specified standard is WLAN (Wireless Local Area Network).

3. The device according to claim 1, wherein said radiated signal of said second antenna has a radiation characteristic with a lobe in direction of said third antenna.

4. The device according to claim 1, wherein said radiated signal of said second antenna has a transmitter power being reduced to permit said radiated signal to be received substantially only within a gap between said second antenna and said third antenna.

5. The device according to claim 4, wherein said transmitter power is reduced for an initial period during provision of the associative link, and is increased for a further period compared to said transmitter power of said initial period after the provision of the associative link.

6. The device according to claim 4, wherein said transmitter power is reduced for an initial period and is increased for a further period compared to said transmitter power of said initial period.

7. The device according to claim 1, wherein said second antenna is oriented to permit a signal radiated from said third antenna to be received at a maximum strength in a specified area around a direct line of sight between said second antenna and said third antenna.

8. The device according to claim 1, wherein said second antenna is activated when a specified area is reached.

9. The device according to claim 8, wherein said specified area is a charging position of the charging station.

10. The device according to claim 1, wherein said second antenna is activated when a speed of the vehicle is below a specified speed.

11. The device according to claim 1, wherein said second antenna is mounted on a side of the vehicle facing a road.

12. The device according to claim 1, wherein said second antenna is one of at least two second charging position antennas each mounted at a respective one of two different sides of the vehicle, one of said at least two second charging position antennas being used to provide the associative link and being one of said at least two second charging position antennas receiving a strongest radiated signal from said third antenna.

13. The device according to claim 12, wherein an established charging position of the vehicle is detected if said signal radiated from said second antenna can be received by said third antenna, at least at another specified signal strength.

14. The device according to claim 1, wherein the associative link between the vehicle and the charging station exists if a signal radiated from said second antenna can be received by said third antenna at least at a specified signal strength.

15. A vehicle, comprising:
at least one device according to claim 1.

16. A unit for providing an associative link between a vehicle having a battery and a charging station supplying the battery with energy, the unit comprising:
a first antenna and a second antenna fixed to the vehicle;
a data antenna fixed to the charging station and configured for data exchange with said first antenna;
a third antenna fixed to the charging station and configured for data exchange with said second antenna to provide the associative link between the vehicle and the charging station;
said third antenna configured to permit a signal radiated from said third antenna to said second antenna to be received substantially only by said second antenna; and
a radio controller integrated in the charging station, connected to said third antenna and to said data antenna and configured to operate according to a specified standard.

17. The device according to claim 16, wherein the specified standard is WLAN (Wireless Local Area Network).

18. The unit according to claim 16, wherein said signal radiated from said third antenna has a radiation characteristic with a lobe in direction of said second antenna.

19. The unit according to claim 16, wherein said signal radiated from said third antenna has a transmitter power being reduced to permit said radiated signal to be received substantially only within a gap between said second antenna and said third antenna.

20. The unit according to claim 19, wherein said transmitter power is reduced for an initial period during provision of the associative link and is increased in relation to said transmitter power of said initial period for another period after provision of the associative link.

21. The unit according to claim 19, wherein said transmitter power is reduced for an initial period and is increased in relation to said transmitter power of said initial period for another period.

22. The unit according to claim 16, wherein said third antenna is oriented to cause a signal radiated from said second antenna to be received at a maximum strength in a specified area around a direct line of sight between said second antenna and said third.

23. The unit according to claim 16, wherein said third antenna is activated when the vehicle reaches a specified area.

24. The unit according to claim 23, wherein said specified area is a charging position of the charging station.

25. The unit according to claim 16, wherein said third antenna is activated when a speed of the vehicle is below a specified speed.

26. The unit according to claim 16, wherein said third antenna is mounted on or in a base of the charging station.

27. The unit according to claim 16, wherein:
said third antenna is one of at least two third antennas each mounted at a different respective position of the charging station; and
one of said at least two third antennas is configured to provide the associative link and is one of said at least two third antennas receiving a strongest signal radiated from said second antenna.

28. The unit according to claim 16, wherein the associative link between the vehicle and the charging station exists if a signal radiated from said third antenna can be received by said second antenna at least at a specified first signal strength.

29. The unit according to claim 28, wherein an established charging position of the vehicle is detected if said signal radiated from said third antenna can be received by said second antenna at least at a specified second signal strength.

30. A charging station, comprising:
at least one unit according to claim 16.

* * * * *